US009916928B2

(12) United States Patent
Oh et al.

(10) Patent No.: US 9,916,928 B2
(45) Date of Patent: Mar. 13, 2018

(54) HIGH VOLTAGE MULTILAYER CERAMIC CAPACITOR AND MANUFACTURING METHOD THEREOF

(71) Applicant: SAMHWA CAPACITOR CO., LTD., Yongin-si (KR)

(72) Inventors: Young Joo Oh, Seoul (KR); Jung Rag Yoon, Yongin-si (KR); Jae Sung Han, Osan-si (KR); Dong Soon Shin, Hwaseong-si (KR)

(73) Assignee: SAMHWA CAPACITOR CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/244,660

(22) Filed: Aug. 23, 2016

(65) Prior Publication Data
US 2017/0062130 A1    Mar. 2, 2017

(30) Foreign Application Priority Data

Aug. 26, 2015 (KR) .......................... 10-2015-0119981

(51) Int. Cl.
| | |
|---|---|
| *H01G 4/30* | (2006.01) |
| *H01G 2/20* | (2006.01) |
| *H01G 2/14* | (2006.01) |
| *H01G 4/008* | (2006.01) |
| *H01G 4/012* | (2006.01) |
| *H01G 4/12* | (2006.01) |

(52) U.S. Cl.
CPC ............ *H01G 2/14* (2013.01); *H01G 4/0085* (2013.01); *H01G 4/012* (2013.01); *H01G 4/12* (2013.01); *H01G 4/30* (2013.01)

(58) Field of Classification Search
CPC .......... H01G 4/232; H01G 4/30; H01G 4/005; H01G 2/20
USPC ........................................................ 361/303
See application file for complete search history.

(56) References Cited

U.S. PATENT DOCUMENTS

| | | | |
|---|---|---|---|
| 5,877,934 A | 3/1999 | Sano et al. | |
| 7,046,500 B2 * | 5/2006 | Lee ......................... | H01G 4/012 361/303 |
| 7,085,124 B2 * | 8/2006 | Togashi ................... | H01G 4/30 361/303 |

(Continued)

FOREIGN PATENT DOCUMENTS

| | | | |
|---|---|---|---|
| JP | 2011134832 A | * | 7/2011 |
| KR | 101498098 | | 3/2015 |

*Primary Examiner* — Eric Thomas
(74) *Attorney, Agent, or Firm* — Cantor Colburn LLP (57) ABSTRACT

Provided is a high voltage multilayer ceramic capacitor and a manufacturing method thereof. The high voltage multilayer ceramic capacitor includes a multilayer ceramic sintering body; a plurality of first inner electrode layer; a plurality of second inner electrode layers; a plurality of first arc shield pattern layers respectively formed inside the multilayer ceramic sintering body to be arranged on a plane the same as those of the plurality of first inner electrode layers and spaced apart from the first inner electrode layers to surround the first inner electrode layers; and a plurality of second arc shield pattern layers respectively formed inside the multilayer ceramic sintering body to be arranged on a plane the same as those of the plurality of second inner electrode layers and spaced apart from the second inner electrode layers to surround the second inner electrode layers.

14 Claims, 9 Drawing Sheets

(56) References Cited

U.S. PATENT DOCUMENTS

| | | | |
|---|---|---|---|
| 7,280,342 B1* | 10/2007 | Randall | H01G 4/232 |
| | | | 361/303 |
| 8,717,738 B2* | 5/2014 | Nishioka | H01G 4/005 |
| | | | 361/301.4 |
| 2002/0075632 A1* | 6/2002 | Nakano | H01G 4/12 |
| | | | 361/320 |
| 2010/0033894 A1* | 2/2010 | Bultitude | H01G 2/20 |
| | | | 361/306.3 |
| 2012/0297596 A1* | 11/2012 | Bultitude | H01G 4/012 |
| | | | 29/25.42 |
| 2014/0301015 A1* | 10/2014 | Kim | H01G 4/30 |
| | | | 361/301.4 |

* cited by examiner

HIGH VOLTAGE MULTILAYER CERAMIC CAPACITOR AND MANUFACTURING METHOD THEREOF

CROSS REFERENCE TO RELATED APPLICATION

This application claims the benefit of Korean Patent Application No. 10-2015-0119981, filed on Aug. 26, 2015, in the Korean Intellectual Property Office, the disclosure of which is incorporated herein by reference.

BACKGROUND OF THE INVENTION

1. Technical Field

The present invention relates to a high voltage multilayer ceramic capacitor and a manufacturing method thereof, particularly, to a high voltage multilayer ceramic capacitor capable of shielding a surface arc-over generation phenomenon which can be generated on the front side of the high voltage multilayer ceramic capacitor.

2. Description of the Related Art

Since a high voltage multilayer ceramic capacitor is used at a DC voltage higher than a few hundred volts, it may generate an arc on the surface due to a strong magnetic field. Such an arc may electrically connect outer electrodes provided on one side and the other side of the high voltage multilayer ceramic capacitor and generate a dielectric breakdown phenomenon between the outer electrodes. That is, the high voltage multilayer ceramic capacitor may generate a surface arc-over generation phenomenon due to a strong electric field and generate a dielectric breakdown phenomenon, and a technique for solving such a phenomenon is disclosed in Korean Patent Registration No. 10-1498098 (Patent document 1).

Korean Patent Registration No. 10-1498098 relates to a high capacitance multilayer having high voltage performance and is configured of first internal conductors, second internal conductors, first taps, second taps, a first external terminal, a second external terminal and at least one shield layer.

The first internal conductors have a first polarity, and the second internal conductors have an opposite polarity. Each of the first internal conductors and the second internal conductors includes a bulk area, a secondary area and a tertiary area, and the second and tertiary areas are narrower than the bulk area and positioned on the opposite side of the bulk area. Each of the first taps is on a plane the same as that of one of the first inner conductors, has an opposite polarity, is spaced apart from the first inner conductor on the same plane as much as a first gap, and is narrower than the bulk area. Each of the second taps is on a plane the same as that of one of the second inner conductors, has an opposite polarity, is spaced apart from the second inner conductor on the same plane as much as the first gap, and is narrower than the bulk area. The first external terminal is a first external terminal electrically contacted with the first inner conductors in one secondary area of each of the first inner conductors and has a first side surface extension unit perpendicular to the first external terminal and continuously extended along the side surface of the capacitor as much as a first predetermined distance, and the second external terminal is a second external terminal electrically contacted with the second inner conductors in one secondary area of each of the second inner conductors and has a second side surface extension unit perpendicular to the second external terminal and continuously extended along the side surface of the capacitor as much as a second predetermined distance. The at least one shield layer includes a first shield conductor electrically contacted with the first external terminal and a second shield conductor electrically contacted with the second external terminal and positioned on a plane the same as that of the first shield conductor. That is, it is configured such that the first inner conductors are extended from the first external terminal toward the second external terminal as far as the gap, and the first shield conductor and the second shield conductor are spaced apart from each other as much as a second gap, and the first gap is the same as the second gap.

Although the conventional high voltage multilayer ceramic capacitor disclosed in Korean Patent Registration No. 10-1498098 may shield the surface arc-over generation phenomenon generated in the direction of laminating inner electrode patterns, i.e., shield the surface arc-over generation phenomenon generated one side and the other side of the vertical direction, owing to the first and second shield conductors, it cannot shield the surface arc-over generation phenomenon generated on one side and the other side of the multilayer ceramic capacitor perpendicular to the vertical direction.

SUMMARY OF THE INVENTION

Accordingly, the present invention has been made keeping in mind the above problems occurring in the prior art, and an object of the present invention is to provide a high voltage multilayer ceramic capacitor in which a plurality of internal electrodes is formed to be exposed to the top or bottom surface of a multilayer ceramic sintering body and is electrically connected when the multilayer ceramic capacitor is mounted on a printed circuit board, an embedded board using the multilayer ceramic capacitor, and a method of manufacturing the same.

Another object of the present invention is to provide a high voltage multilayer ceramic capacitor in which internal electrodes formed to be exposed to the top or bottom surface of a multilayer ceramic sintering body have different areas so that a multilayer ceramic capacitor having varying capacitance is mounted on a printed circuit board, an embedded board using the multilayer ceramic capacitor, and a method of manufacturing the same.

Still another object of the present invention is to provide a high voltage multilayer ceramic capacitor in which an external electrode is formed in an internal electrode exposed to the top or bottom surface of a multilayer ceramic sintering body in order to improve an adhesive force between the multilayer ceramic capacitor and a printed circuit board when the multilayer ceramic capacitor is mounted on the printed circuit board, a multilayer ceramic capacitor, an embedded board using the multilayer ceramic capacitor, and a method of manufacturing the same.

Further yet another object of the present invention is to provide a high voltage multilayer ceramic capacitor in which internal electrodes are formed to be exposed to the top or bottom surface of a multilayer ceramic sintering body so that an embedded board having the multilayer ceramic capacitor embedded therein can be easily manufactured, an embedded board using the multilayer ceramic capacitor, and a method of manufacturing the same.

A high voltage multilayer ceramic capacitor according to an embodiment of the present invention provides includes a multilayer ceramic sintering body and one or two or more internal electrode units formed to be placed inside the multilayer ceramic sintering body. Each of the one or two or more internal electrode units includes a plurality of first internal electrodes formed in the multilayer ceramic sintering body in such a way as to be spaced apart from each other, one or more of both ends of one side of each of the plurality of first internal electrodes being formed to be exposed to the top or bottom surface of the multilayer ceramic sintering body, and a plurality of second internal electrodes placed between the plurality of first internal electrodes, respectively, and formed in the multilayer ceramic sintering body in such a way as to be spaced apart from each other, one or more of both ends of the other side of each of the plurality of second internal electrodes being formed to be exposed to the top or bottom surface of the multilayer ceramic sintering body.

An embedded board using a high voltage multilayer ceramic capacitor according to an embodiment of the present invention includes a first insulating substrate; a second insulating substrate formed over the first insulating substrate; one or more multilayer ceramic capacitors disposed with a middle insulating substrate interposed between the first insulating substrate and the second insulating substrate; one or more first conductive connection pads inserted into the first insulating substrate or the second insulating substrate and connected to one side of the top or bottom surface of the multilayer ceramic capacitor; and one or more second conductive connection pads inserted into the first insulating substrate or the second insulating substrate and connected to the other side of the top or bottom surface of the multilayer ceramic capacitor. One or more first laser processing holes into which the first conductive connection pad is inserted and one or more second laser processing holes into which the second conductive connection pad is inserted are formed in each of the first insulating substrate and the second insulating substrate.

A method of manufacturing a high voltage multilayer ceramic capacitor according to an embodiment of the present invention includes preparing a plurality of green sheets; forming a plurality of first internal electrodes or a plurality of second internal electrodes in a top surface of the plurality of green sheets; forming a compression body by sequentially stacking and compressing the plurality of green sheets in which the plurality of first internal electrodes or the plurality of second internal electrodes is formed in a vertical direction so that the first internal electrodes and the second internal electrodes become symmetrical to each other; forming green chips by cutting the compression body so that cross sections of the plurality of first internal electrodes or the plurality of second internal electrodes are externally exposed; forming a multilayer ceramic sintering body by sintering the green chip; polishing a surface of the multilayer ceramic sintering body after the multilayer ceramic sintering body is formed; and forming first external electrodes or second external electrodes by coating a metal material on one side and second side of the top or bottom surface of the multilayer ceramic sintering body after the multilayer ceramic sintering body is polished. Forming the green chip includes cutting the compression body so that one or more of both ends of one side or second side of each of the plurality of first internal electrodes or the plurality of second internal electrodes are exposed to the top or bottom surface of the green chip.

BRIEF DESCRIPTION OF THE DRAWINGS

The above and/or other aspects of the present invention will become apparent and more readily appreciated from the following description of the exemplary embodiments, taken in conjunction with the accompanying drawings in which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, embodiments of a high voltage multilayer ceramic capacitor of the present invention and a manufacturing method thereof will be described with reference to the accompanying drawings.

As shown in FIGS. 1 to 4, a high voltage multilayer ceramic capacitor of the present invention is configured of a multilayer ceramic sintering body 10, a plurality of first inner electrode layers 20, a plurality of second inner electrode layers 30, a first outer electrode 40, a second outer electrode 50, a plurality of first arc shield pattern layers 60 and a plurality of second arc shield pattern layers 70.

The first outer electrode 40, the second outer electrode 50, the plurality of first arc shield pattern layers 60 and the plurality of second arc shield pattern layers 70 are formed inside the multilayer ceramic sintering body 10, and the plurality of first inner electrode layers 20 is respectively formed inside the multilayer ceramic sintering body 10 to expose the end portion of one side of a first direction X toward the end portion of one side of the first direction X of the multilayer ceramic sintering body 10. The plurality of second inner electrode layers 30 is respectively formed inside the multilayer ceramic sintering body 10 to expose the end portion of the other side of the first direction X toward the end portion of the other side of the first direction X of the multilayer ceramic sintering body 10 and to alternate with the plurality of first inner electrode layers 20. The first outer electrode 40 is formed to cover the end portion of one side of the first direction X of the multilayer ceramic sintering body 10 to be connected to each of the plurality of first inner electrode layers 20, and the second outer electrode 50 is formed to cover the end portion of the other side of the first direction X of the multilayer ceramic sintering body 10 to be connected to each of the plurality of second inner electrode layers 30. The plurality of first arc shield pattern layers 60 is respectively formed inside the multilayer ceramic sintering body 10 to be arranged on a plane the same as those of the plurality of first inner electrode layers 20 and spaced apart from the first inner electrode layers 20 to surround the first inner electrode layers 20, and the plurality of second arc shield pattern layers 70 is respectively formed inside the multilayer ceramic sintering body 10 to be arranged on a plane the same as those of the plurality of second inner electrode layers 30 and spaced apart from the second inner electrode layers 30 to surround the second inner electrode layers 30, and thus the surface arc-over generation phenomenon which can be generated on the front side of the high voltage multilayer ceramic capacitor of the present invention is shielded.

The configuration of the high voltage multilayer ceramic capacitor of the present invention is described below in more detail.

Figure 1:
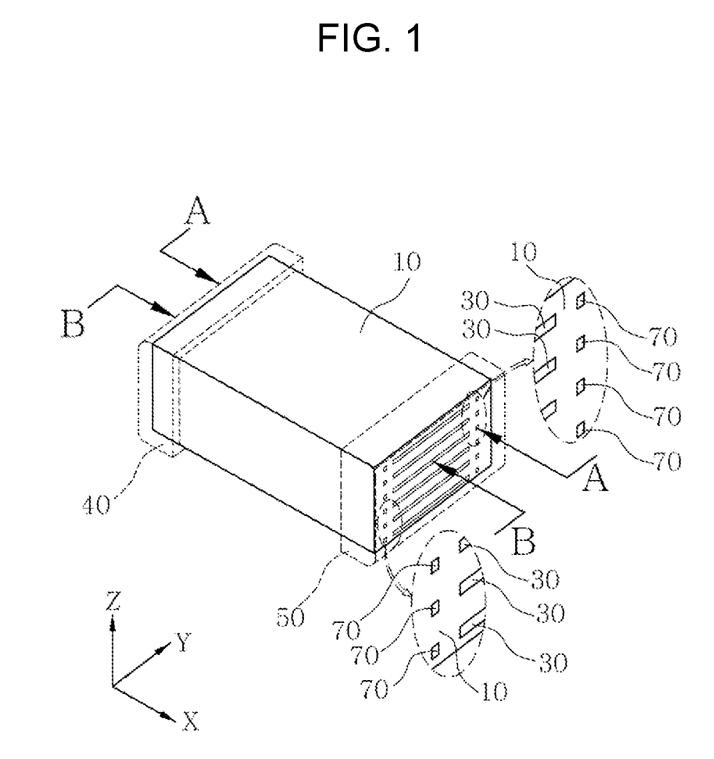
FIG. 1 is a perspective view of a high voltage multilayer ceramic capacitor according to an embodiment of the present invention.
Figure 2:
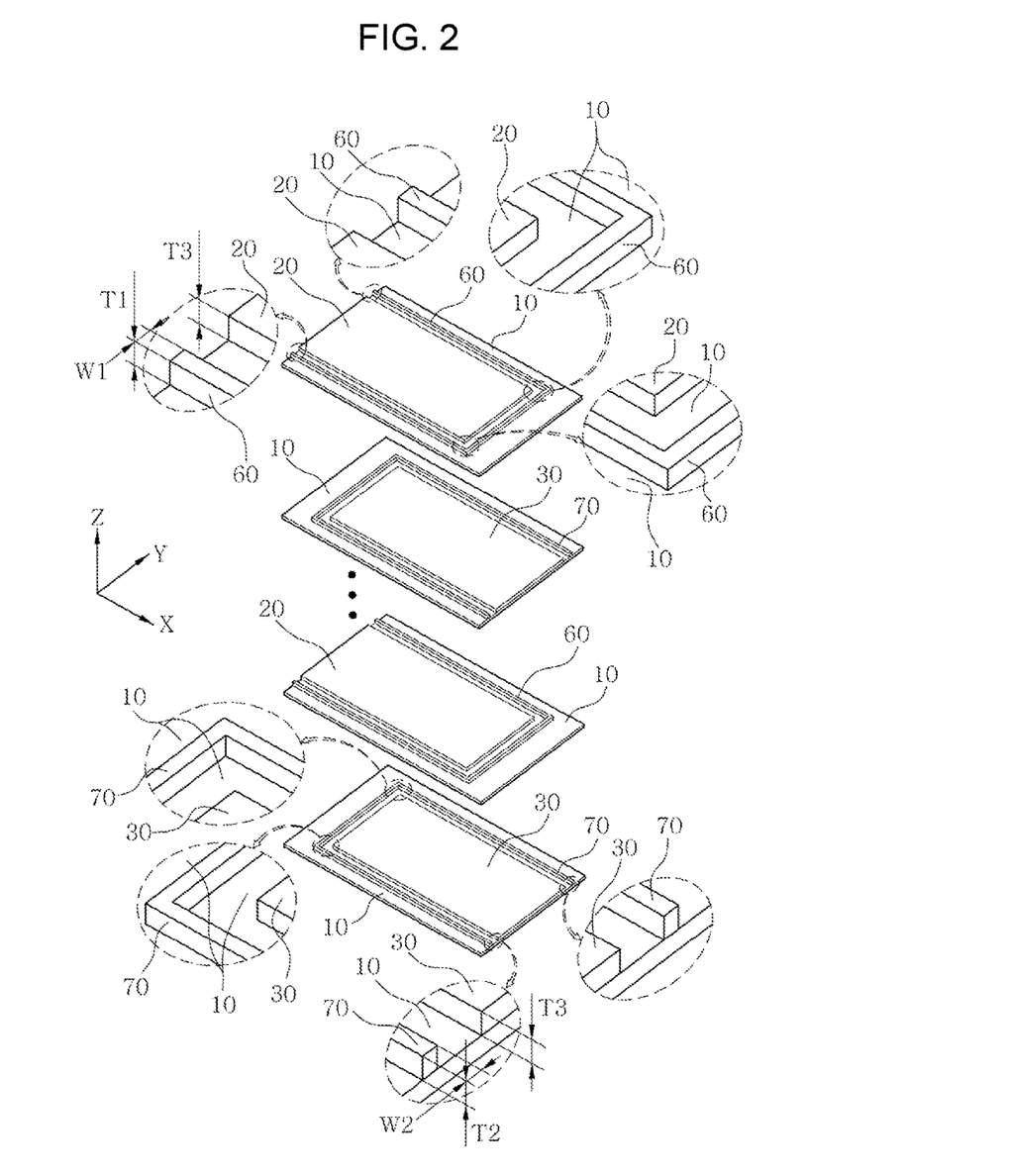
FIG. 2 is an exploded perspective view of the multilayer ceramic capacitor shown in FIG. 1.
Figure 3:
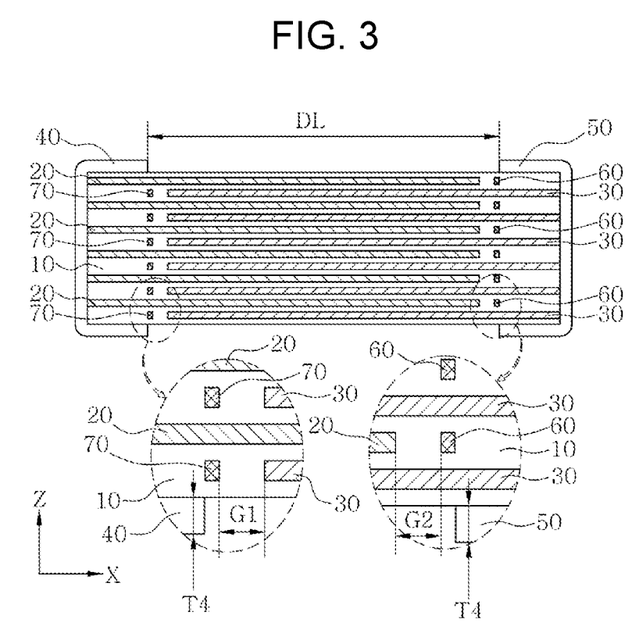
FIG. 3 is an enlarged cross-sectional view taken along the line A-A in FIG. 1.

The multilayer ceramic sintering body 10 shows a state of completing a predetermined process of a conventional multilayer ceramic capacitor manufacturing technique as shown in FIGS. 1 to 3, and a first outer electrode 40, a second outer electrode 50, a plurality of first arc shield pattern layers 60 and a plurality of second arc shield pattern layers 70 are formed inside thereof.

The plurality of first inner electrode layers 20 is respectively formed inside the multilayer ceramic sintering body 10 as shown in FIGS. 2 and 3 to expose the end portion of one side of the first direction X toward the end portion of one side of the first direction X of the multilayer ceramic sintering body 10, and the plurality of second inner electrode layers 30 is respectively formed inside the multilayer ceramic sintering body 10 as shown in FIGS. 2 and 3 to expose the end portion of the other side of the first direction X toward the end portion of the other side of the first direction X of the multilayer ceramic sintering body 10 and to alternate with the plurality of first inner electrode layers 20. The plurality of first inner electrode layers 20 and the plurality of second inner electrode layers 30 are respectively formed as a thin film having a thickness T3 of 0.5 to 5 μm, and a sum of the number of the plurality of first inner electrode layers 20 and the number of the plurality of second inner electrode layers 30 is three hundred or more. That is, if the plurality of first inner electrode layers 20 is formed to be one hundred and fifty or more, the plurality of second inner electrode layers 30 is also provided to be one hundred and fifty or more, and thus three hundred or more layers are laminated in total.

The first outer electrode 40 is formed as shown in FIGS. 1 and 3 to cover the end portion of one side of the first direction X of the multilayer ceramic sintering body 10 to be connected to each of the plurality of first inner electrode layers 20, and the second outer electrode 50 is formed as shown in FIGS. 1 and 3 to cover the end portion of the other side of the first direction X of the multilayer ceramic sintering body 10 to be connected to each of the plurality of second inner electrode layers 30. The thicknesses T4 of the first outer electrode 40 and the second outer electrode 50 are respectively 30 μm or more, and the distance DL between the first and second outer electrodes is 1.9 mm or more.

The plurality of first arc shield pattern layers 60 is respectively formed inside the multilayer ceramic sintering body 10 as shown in FIGS. 2 and 3 to be arranged on a plane the same as those of the plurality of first inner electrode layers 20 and spaced apart from the first inner electrode layers 20 to surround the first inner electrode layers 20, and the plurality of second arc shield pattern layers 70 is respectively formed inside the multilayer ceramic sintering body 10 as shown in FIGS. 1 to 3 to be arranged on a plane the same as those of the plurality of second inner electrode layers 30 and spaced apart from the second inner electrode layers 30 to surround the second inner electrode layers 30, and thus the surface arc-over generation phenomenon which can be generated on the front side of the high voltage multilayer ceramic capacitor of the present invention is shielded. That is, since the plurality of first arc shield pattern layers 60 and the plurality of second arc shield pattern layers 70 are respectively formed to surround the first inner electrode layers 20 and the second inner electrode layers 30 on the same plane, the surface arc-over generation phenomenon is shielded by a strong electric field generated by the current flowing through the edges of the first inner electrode layers 20 and the second inner electrode layers 30, and thus the multilayer ceramic capacitor of the present invention may shield the surface arc-over generation phenomenon on the front side.

The plurality of first arc shield pattern layers 60 and the plurality of second arc shield pattern layers 70 are respectively formed in the shape of ' ㄷ ' as shown in FIGS. 2 and 7 to 10, in a thickness T1 and T2 the same as the thickness T3 of the first inner electrode layer 20 or the second inner electrode layer 30 and in a width W1 and W2 of 30 to 100 μm. The plurality of first arc shield pattern layers 60 and the plurality of second arc shield pattern layers 70 are formed in a metallic material or a semiconductive material, and a mixture of one or two or more of Ni, Cu, Zn, Al and Ag is used as the metallic material, and a mixture of a first material and a second material is used as the semiconductive material, in which $BaTiO_3$ or $(BaCa)TiO_3$ is used as the first material, and a mixture of one or two or more of PbO, NiO, $Cr_2O_3$, $Co_2O_3$, MnO, SrO, $SiO_2$ and MgO is used as the second material. Here, each of the PbO, NiO, $Cr_2O_3$, $Co_2O_3$, MnO, SrO, $SiO_2$ and MgO has a semiconductive property owing to non reducible sintering.

Figure 4:
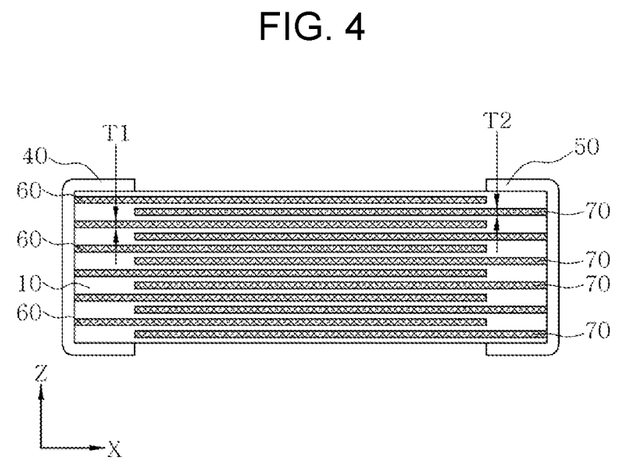
FIG. 4 is an enlarged cross-sectional view taken along the line B-B in FIG. 1.
Figure 7:
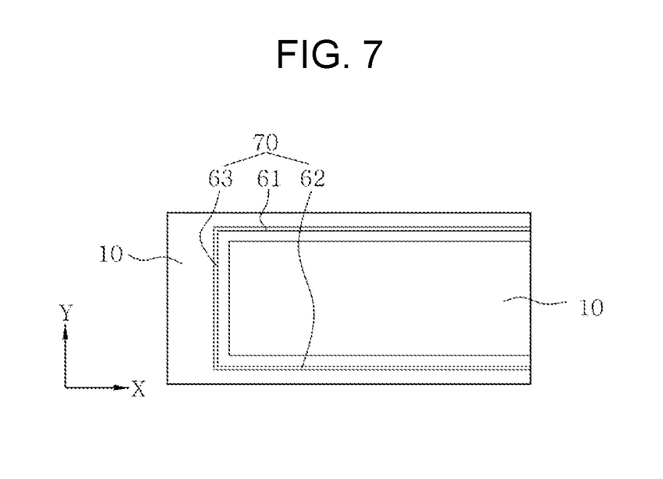
FIG. 7 is a plan view showing the second arc shield pattern layer shown in FIG. 4.
Figure 8:
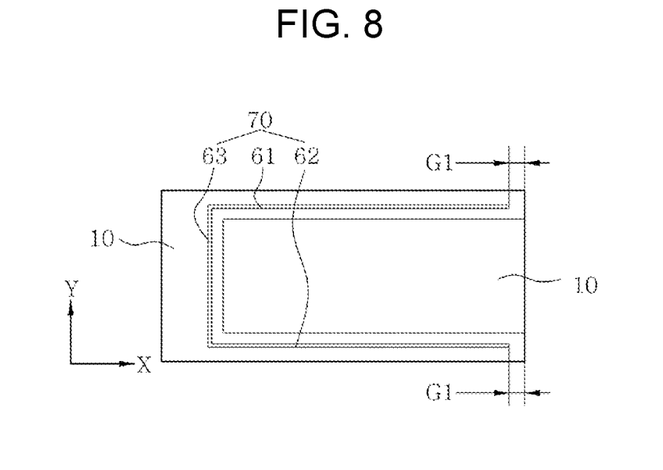
FIG. 8 is a plan view showing the second arc shield pattern layer shown in FIG. 5.

Since the plurality of first arc shield pattern layers 60 and the plurality of second arc shield pattern layers 70 are respectively configured to be the same as each other as shown in FIG. 4, the detailed configuration of the plurality of first arc shield pattern layers 60 and the plurality of second arc shield pattern layers 70 will be described below using the plurality of second arc shield pattern layers 70. Each of the second arc shield pattern layers 70 is configured of a first linear arc shield member 61, a second linear arc shield member 62 and a third linear arc shield member 63 as shown in FIGS. 4, 7 and 8.

The first linear arc shield member 61 is formed at one side of a second direction Y perpendicular to the first direction X of the first inner electrode layer 20 or the second inner electrode layer 30 inside the multilayer ceramic sintering body 10 to be spaced apart from the first inner electrode layer 20 or the second inner electrode layer 30, and the second linear arc shield member 62 is formed at the other side of the second direction Y perpendicular to the first direction X of the first inner electrode layer 20 or the second inner electrode layer 30 inside the multilayer ceramic sintering body 10 to be spaced apart from the first inner electrode layer 20 or the second inner electrode layer 30. The third linear arc shield member 63 is formed inside the multilayer ceramic sintering body 10 to be connected to one sides or the other sides of the first direction X of the first linear arc shield member 61 and the second linear arc shield member 62.

Figure 5:
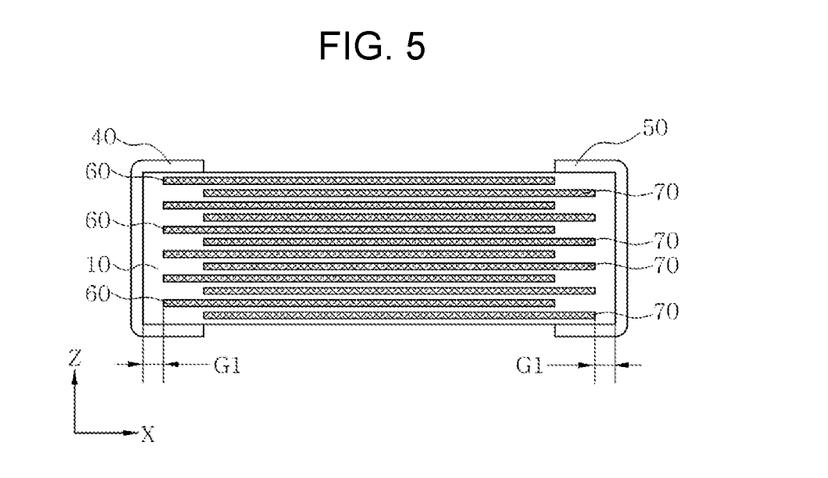
FIG. 5 is cross-sectional view showing another embodiment of the first and second arc shield pattern layers shown in FIG. 4.

The first linear arc shield member 61, the second linear arc shield member 62 and the third linear arc shield member 63 are respectively formed using a metallic material, in a thickness T1 and T2 the same as the thickness T3 of the first inner electrode layer 20 or the second inner electrode layer 30 and in a width W1 and W2 (shown in FIG. 2) of 30 to 100 μm. The first linear arc shield member 61 and the second linear arc shield member 62 are respectively formed to expose the end portion of one side or the other side of the first direction X toward the end portion of one side or the other side of the first direction X of the multilayer ceramic sintering body 10 to be connected to the first outer electrode 40 or the second outer electrode 50 as shown in FIGS. 4 and 7 or formed to be spaced apart from the first outer electrode 40 or the second outer electrode 50 as shown in FIGS. 5 and 8, and the space gap G1 is 30 to 70 μm.

Figure 9:
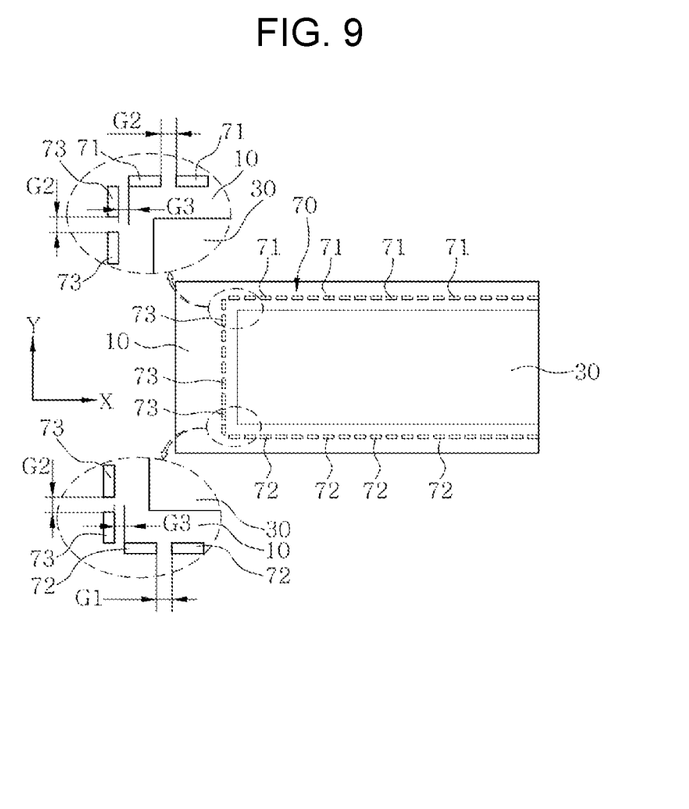
FIG. 9 is a plan view showing another embodiment of the second arc shield pattern layer shown in FIG. 7.
Figure 10:
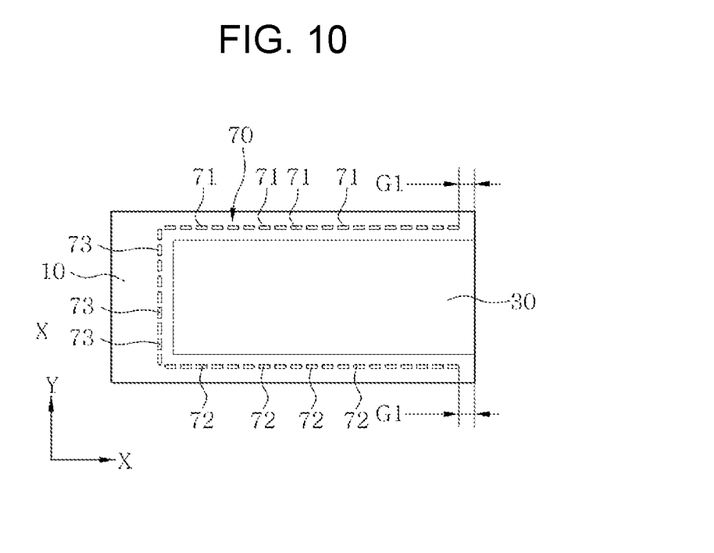
FIG. 10 is a plan view showing another embodiment of the second arc shield pattern layer shown in FIG. 8.

Another embodiment of a plurality of first arc shield pattern layers 60 and a plurality of second arc shield pattern layers 70 is shown in FIGS. 9 and 10. Although the another embodiment of a plurality of first arc shield pattern layers 60 and a plurality of second arc shield pattern layers 70 shown in FIGS. 9 and 10 shows a second arc shield pattern layer 70, since the second arc shield pattern layers 70 and the first arc shield pattern layers 60 are formed to be the same, they will be described using the second arc shield pattern layer 70.

Another embodiment of a plurality of second arc shield pattern layers 70 is configured of a plurality of first arc shield blocks 71, a plurality of second arc shield blocks 72 and a plurality of third arc shield blocks 73.

The plurality of first arc shield blocks 71 is respectively formed at one side of the second direction Y perpendicular to the first direction X of the first inner electrode layer 20 or the second inner electrode layer 30 inside the multilayer ceramic sintering body 10 to be spaced apart from the first inner electrode layer 20 or the second inner electrode layer 30 and spaced apart from each other by a first gap G2. The plurality of second arc shield blocks 72 is respectively formed at the other side of the second direction Y perpendicular to the first direction X of the first inner electrode layer 20 or the second inner electrode layer 30 inside the multilayer ceramic sintering body 10 to be spaced apart from the first inner electrode layer 20 or the second inner electrode layer 30 and spaced apart from each other by the first gap G2. The plurality of third arc shield blocks 73 is formed at one side or the other side of the first direction X of each of the plurality of first arc shield blocks 71 and the plurality of second arc shield blocks 72 inside the multilayer ceramic sintering body 10 to be spaced apart from the plurality of first arc shield blocks 71 and the plurality of second arc shield blocks 72 by a second gap G3 and to be spaced apart from each other by the first gap G2. Here, the first gap G2 and the second gap G3 are respectively 30 to 70 μm.

The plurality of first arc shield blocks 71, the plurality of second arc shield blocks 72 and the plurality of third arc shield blocks 73 are respectively formed using a metallic material, in a thickness T1 and T2 (shown in FIG. 2) the same as the thickness T3 of the first inner electrode layer 20 or the second inner electrode layer 30 and in a width W1 and W2 (shown in FIG. 2) of 30 to 100 μm.

One of the first arc shield blocks 71 and one of the second arc shield blocks 72 arranged at one side or the other side of the first direction X among the plurality of first arc shield blocks 71 and the plurality of second arc shield blocks 72 are respectively formed to expose the end portion of one side or the other side of the first direction X toward the end portion of one side or the other side of the first direction X of the multilayer ceramic sintering body 10 to be connected to the first outer electrode 40 or the second outer electrode 50 as shown in FIG. 9 or formed to be spaced apart from the first outer electrode 40 or the second outer electrode 50 by the first gap G1 as shown in FIG. 10.

As described above, the present invention may reduce the manufacturing process time and cost of the high voltage multilayer ceramic by forming a plurality of first arc shield pattern layers 60 and a plurality of second arc shield pattern layers 70 in the shape of '⊏' at the same time when the first inner electrode layer 20 and the second inner electrode layer 30 are formed.

Figure 6:
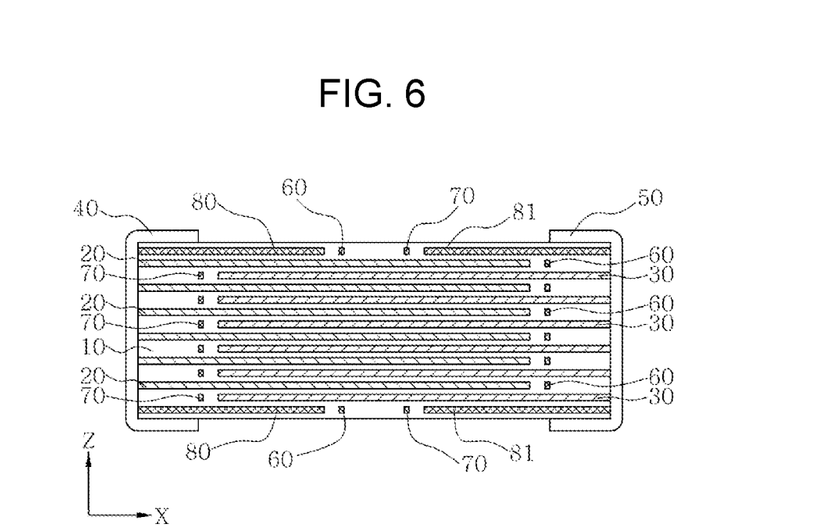
FIG. 6 is cross-sectional view showing still another embodiment of the first and second arc shield pattern layers shown in FIG. 4.
Figure 11:
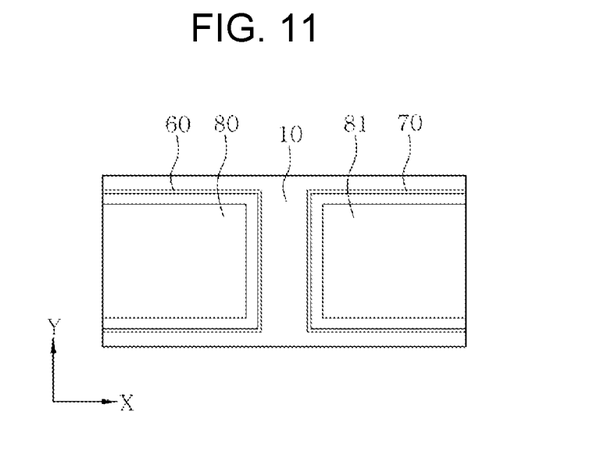
FIG. 11 is a plan view showing the arc shield plate shown in FIG. 6.

Another embodiment of a plurality of first arc shield pattern layers 60 and a plurality of second arc shield pattern layers 70 is shown in FIGS. 6 and 11. The multilayer ceramic sintering body 10 shown in FIGS. 6 and 11 includes, on the bottom and the top, a pair of arc shield plates 80 and 81, and a first arc shield pattern layer 60 and a second arc shield pattern layer 70 respectively formed to surround each of the pair of arc shield plates 80 and 81.

The pair of arc shield plates 80 and 81 are formed to be spaced apart from each other to respectively expose the end portion of one side or the other side of the first direction X toward the end portion of one side or the other side of the first direction X of the multilayer ceramic sintering body 10, and the first arc shield pattern layer 60 is formed to surround one of the pair of arc shield plates 80 and 81, and the second arc shield pattern layer 70 is formed to surround the other one. The thickness and material of the pair of arc shield plates 80 and 81 are the same as those of the first arc shield pattern layers 60 or the second arc shield pattern layers 70.

Since a plurality of first arc shield pattern layers 60 and a plurality of second arc shield pattern layers 70 are applied, the high voltage multilayer ceramic capacitor of the present invention is used in a range of 500 Vdc to 2 KVdc (DC voltage).

A method of manufacturing the high voltage multilayer ceramic capacitor of the present invention having a configuration as described above is described below with reference to FIGS. 12 to 14.

Figure 12:
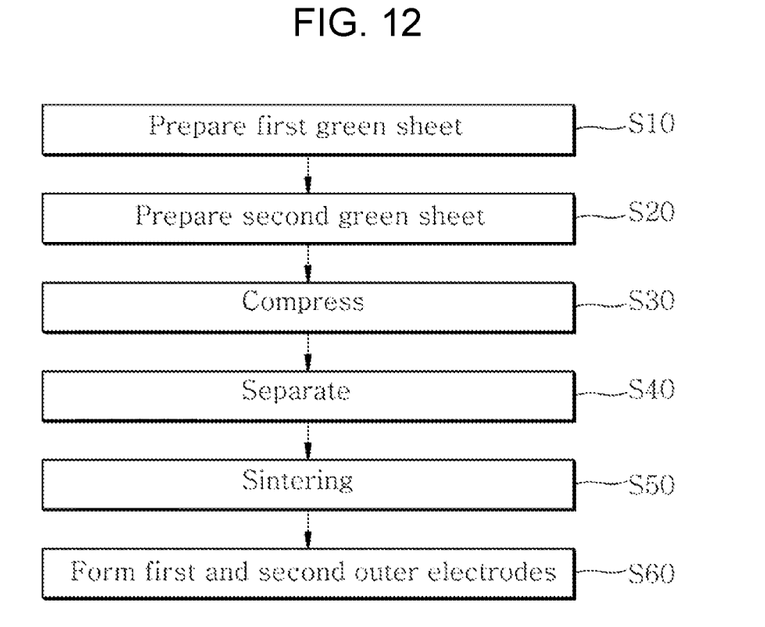
FIG. 12 is a flowchart illustrating a method of manufacturing a high voltage multilayer ceramic capacitor of the present invention.
Figure 13:
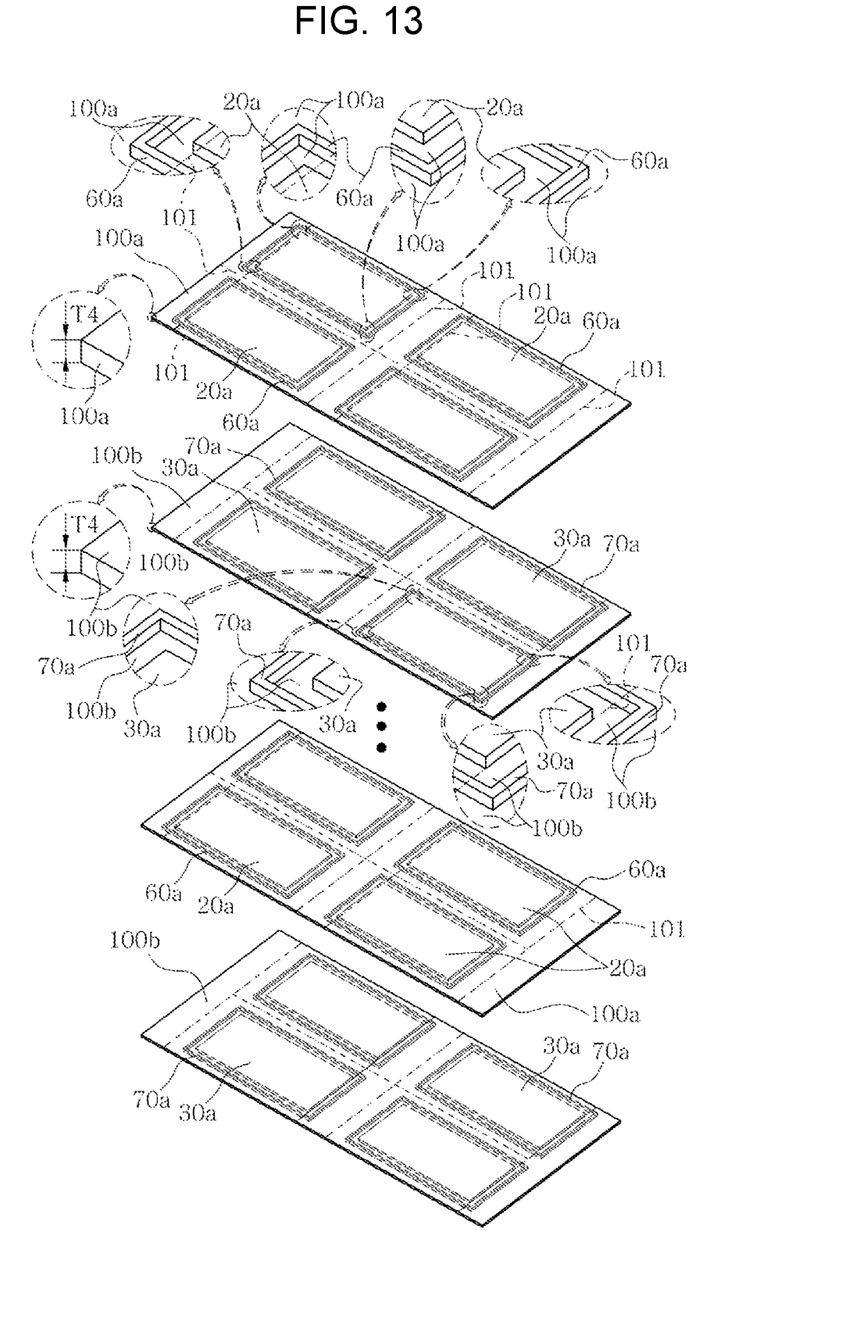
FIG. 13 is a perspective view showing a plurality of first green sheets and a plurality of second green sheets separated in an alternated state.
Figure 14:
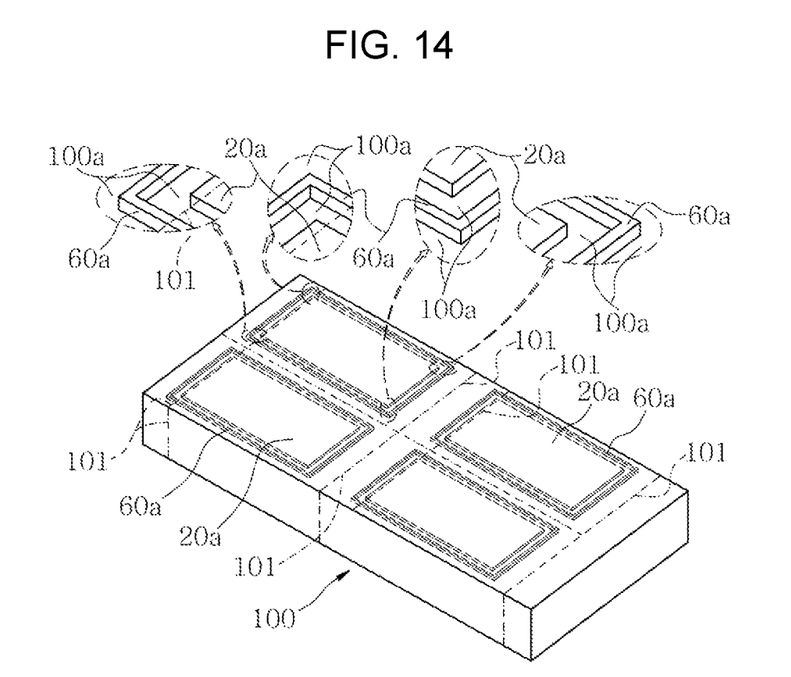
FIG. 14 is a perspective view showing a plurality of first green sheets and a plurality of second green sheets shown in FIG. 13 in a laminated and compressed state.

As shown in FIGS. 12 to 14, a method of manufacturing a high voltage multilayer ceramic capacitor of the present invention first prepares a plurality of first green sheets 100a respectively including, on the top, a first inner electrode layer pattern 20a and a first arc shield pattern 60a formed to be spaced apart from the first inner electrode layer pattern 20a to surround the first inner electrode layer pattern 20a (step S10). The method prepares a plurality of second green sheets 100b respectively including, on the top, a second inner electrode layer pattern 30a formed at a position partially overlapped with the first inner electrode layer pattern 20a and a second arc shield pattern 70a formed to be spaced apart from the second inner electrode layer pattern 30a to surround the second inner electrode layer pattern 30a (step S20). Here, when the plurality of first green sheets 100a and the plurality of second green sheets 100b are prepared, the first inner electrode layer pattern 20a and the second inner electrode layer pattern 30a are simultaneously formed on the first green sheet 100a and the first arc shield pattern 60a and the second arc shield pattern 70a are simultaneously formed on the second green sheet 100b using a silk printing method, and thus the time of manufacturing the high voltage multilayer ceramic capacitor of the present invention can be reduced.

When the plurality of first green sheets 100a and the plurality of second green sheets 100b are prepared, a sum of the number of the first green sheets 100a and the number of the second green sheets 100b is five hundred or more, thicknesses of the first green sheets 100a and the second green sheets 100b are respectively 2 to 50 μm, thicknesses T1, T2, T3 and T4 of the first inner electrode layer pattern 20a, the second inner electrode layer pattern 30a, the first arc shield pattern 60a and the second arc shield pattern 70a are respectively 0.5 to 5 μm, and widths W1 and W2 of the first arc shield pattern 60a and the second arc shield pattern 70a are respectively 30 to 100 μm.

If the plurality of first green sheets 100a and the plurality of second green sheets 100b are prepared, a green sheet multilayer body 100 is formed by laminating and compressing the plurality of first green sheets 100a and the plurality of second green sheets 100b in a manner of partially overlapping and alternating the first inner electrode layer pattern 20a and the second inner electrode layer pattern 30a with each other (step S30).

If the green sheet multilayer body 100 is formed, the green sheet multilayer body 100 is separated into ceramic multilayer bodies (not shown) by cutting the green sheet multilayer body 100 to expose the end portions of one side or the other side of the first direction X of the first inner electrode layer pattern 20a, the second inner electrode layer pattern 30a, the first arc shield pattern 60a and the second arc shield pattern 70a toward the outside and not to expose the end portions of one side or the other side of the second direction Y perpendicular to the first direction X of the first arc shield pattern 60a or the second arc shield pattern 70a (step S40).

When the work of separating the green sheet multilayer body 100 into the ceramic multilayer bodies is performed, the first inner electrode layer 20, the second inner electrode layer 30, the first arc shield pattern layer 60 and the second arc shield pattern layer 70 are formed by cutting the green sheet multilayer body 100 along the cutting line 101 indicated on the green sheet multilayer body 100 to expose the end portions of the one side of the other side of the first direction X of the first inner electrode layer pattern 20a, the second inner electrode layer pattern 30a, the first arc shield pattern 60a and the second arc shield pattern 70a and not to expose the end portions of one side or the other side of the second direction Y perpendicular to the first direction X of the first arc shield pattern 60a and the second arc shield pattern 70a. Here, since a well-known technique is applied as the separating technique, description thereof will be omitted.

If the green sheet multilayer body 100 is separated into the ceramic multilayer bodies, the multilayer ceramic sintering body 10 (shown in FIG. 1) is formed by sintering the ceramic multilayer bodies. Since a well-known technique is applied to the sintering process, description thereof will be omitted.

f the multilayer ceramic sintering body 10 is formed by sintering the ceramic multilayer bodies, the first outer electrode 40 and the second outer electrode 50 are formed to cover the end portions of one side and the other side of the multilayer ceramic sintering body 10 after grinding the multilayer ceramic sintering body 10 (step S50 □ 60). Here, since a well-known technique is applied as the technique of forming the first outer electrode 40 and the second outer electrode 50, description thereof will be omitted. In the above description, the first direction is a direction of placing the first inner electrode layer 20 or the second inner electrode layer 30 in the horizontal direction and placing the first outer electrode 40 and the second outer electrode 50 to face each other, and the second direction Y is a direction perpendicular to the first direction X, and the third direction Z is the vertical direction of laminating the first inner electrode layer 20 or the second inner electrode layer 30.

As described above, the high voltage multilayer ceramic capacitor of the present invention and a manufacturing method thereof can improve reliability of a product by shielding a surface arc-over generation phenomenon which can be generated on the front side of the high voltage multilayer ceramic capacitor.

A high voltage multilayer ceramic capacitor of the present invention and a manufacturing method thereof can be applied in the field of multilayer ceramic capacitor manufacturing industry.

A high voltage multilayer ceramic capacitor of the present invention and a manufacturing method thereof have an advantage of improving reliability of a product by shielding a surface arc-over generation phenomenon which can be generated on the front side of the high voltage multilayer ceramic capacitor.

What is claimed is:

1. A high voltage multilayer ceramic capacitor comprising:
a multilayer ceramic sintering body;
a plurality of first inner electrode layers respectively formed inside the multilayer ceramic sintering body to expose an end portion of one side of a first direction toward an end portion of one side of the first direction of the multilayer ceramic sintering body;
a plurality of second inner electrode layers respectively formed inside the multilayer ceramic sintering body to expose an end portion of the other side of the first direction toward an end portion of the other side of the first direction of the multilayer ceramic sintering body and to alternate with the plurality of first inner electrode layers;
a first outer electrode formed to cover the end portion of one side of the first direction of the multilayer ceramic sintering body to be connected to each of the plurality of first inner electrode layers;
a second outer electrode formed to cover the end portion of the other side of the first direction of the multilayer ceramic sintering body to be connected to each of the plurality of second inner electrode layers;
a plurality of first arc shield pattern layers respectively formed inside the multilayer ceramic sintering body to be arranged on a plane the same as those of the plurality of first inner electrode layers and spaced apart from the first inner electrode layers to surround the first inner electrode layers; and
a plurality of second arc shield pattern layers respectively formed inside the multilayer ceramic sintering body to be arranged on a plane the same as those of the plurality of second inner electrode layers and spaced apart from the second inner electrode layers to surround the second inner electrode layers,
wherein the plurality of first arc shield pattern layers and the plurality of second arc shield pattern layers are respectively formed in a shape of ' ⌐ ' in a thickness the same as a thickness of the first inner electrode layer or the second inner electrode layer and in a width of 30 to 100 µm.

2. The capacitor according to claim 1, wherein the plurality of first arc shield pattern layers and the plurality of second arc shield pattern layers are formed in a metallic material or a semiconductive material,
wherein the metallic material is formed of a mixture of one or more selected from the group consisting of Ni, Cu, Zn, Al and Ag, and the semiconductive material is formed of a mixture of a first material and a second material, and
wherein the first material is formed of $BaTiO_3$ or $(BaCa)TiO_3$, and the second material is formed of a mixture of one or more selected from the group consisting of PbO, NiO, $Cr_2O_3$, $Co_2O_3$, MnO, SrO, $SiO_2$ and MgO, the second material providing a semiconductive property from non-reducible sintering of the mixture.

3. The capacitor according to claim 1, wherein thicknesses of the plurality of first inner electrode layers and the plurality of second inner electrode layers are respectively 0.5 to 5 µm, and a sum of the number of the plurality of first inner electrode layers and the number of the plurality of second inner electrode layers is three hundred or more.

4. The capacitor according to claim 1, wherein thicknesses of the first outer electrode and the second outer electrode are respectively 30 µm or more, and a distance DL between the first and second outer electrodes is 1.9 mm or more.

5. The capacitor according to claim 1, wherein the plurality of first arc shield pattern layers and the plurality of second arc shield pattern layers are respectively configured of:
a first linear arc shield member formed at one side of a second direction perpendicular to the first direction of the first inner electrode layer or the second inner electrode layer inside the multilayer ceramic sintering body to be spaced apart from the first inner electrode layer or the second inner electrode layer;
a second linear arc shield member formed at the other side of the second direction perpendicular to the first direction of the first inner electrode layer or the second inner electrode layer inside the multilayer ceramic sintering body to be spaced apart from the first inner electrode layer or the second inner electrode layer; and
a third linear arc shield member formed inside the multilayer ceramic sintering body to be connected to one sides or the other sides of the first direction of the first linear arc shield member and the second linear arc shield member.

6. The capacitor according to claim 5, wherein the first linear arc shield member, the second linear arc shield member and the third linear arc shield member are respectively formed using a metallic material in a thickness the same as a thickness of the first inner electrode layer or the second inner electrode layer and in a width of 30 to 100 µm, and the first linear arc shield member and the second linear arc shield member are respectively formed to expose an end portion of one side or the other side of the first direction toward the end portion of one side or the other side of the first direction of the multilayer ceramic sintering body to be connected to the first outer electrode or the second outer electrode or formed to be spaced apart from the first outer electrode or the second outer electrode, wherein the space gap is 30 to 70 µm.

7. The capacitor according to claim 1, wherein the plurality of first arc shield pattern layers and the plurality of second arc shield pattern layers are respectively configured of:
a plurality of first arc shield blocks respectively formed at one side of the second direction perpendicular to the first direction of the first inner electrode layer or the second inner electrode layer inside the multilayer ceramic sintering body to be spaced apart from the first inner electrode layer or the second inner electrode layer and spaced apart from each other by a first gap;
a plurality of second arc shield blocks respectively formed at the other side of the second direction perpendicular to the first direction of the first inner electrode layer or the second inner electrode layer inside the multilayer ceramic sintering body to be spaced apart from the first inner electrode layer or the second inner electrode layer and spaced apart from each other by the first gap; and
a plurality of third arc shield blocks formed at one side or the other side of the first direction of each of the first linear arc shield member and the second linear arc shield member inside the multilayer ceramic sintering body to be spaced apart from the first linear arc shield member and the second linear arc shield member by a second gap and to be spaced apart from each other by the first gap, wherein the first gap and the second gap are respectively 30 to 70 µm.

8. The capacitor according to claim 7, wherein the plurality of first arc shield blocks, the plurality of second arc shield blocks and the plurality of third arc shield blocks are respectively formed using a metallic material in a thickness the same as a thickness of the first inner electrode layer or the second inner electrode layer and in a width of 30 to 100 µm, and one of the first arc shield blocks and one of the second arc shield blocks among the plurality of first arc shield blocks and the plurality of second arc shield blocks are respectively formed to expose an end portion of one side or the other side of the first direction toward the end portion of one side or the other side of the first direction of the multilayer ceramic sintering body to be connected to the first outer electrode or the second outer electrode or formed to be spaced apart from the first outer electrode or the second outer electrode by the first gap.

9. The capacitor according to claim 1, wherein the high voltage multilayer ceramic capacitor is used in a range of 500 Vdc to 2 KVdc.

10. The capacitor according to claim 1, wherein the multilayer ceramic sintering body includes, on a bottom and a top, a pair of arc shield plates, and a first arc shield pattern layer and a second arc shield pattern layer respectively formed to surround each of the pair of arc shield plates, wherein the pair of arc shield plates are formed to be spaced apart from each other to respectively expose an end portion of one side or the other side of the first direction toward the end portion of one side or the other side of the first direction of the multilayer ceramic sintering body, and the first arc shield pattern layer is formed to surround one of the pair of arc shield plates, and the second arc shield pattern layer is formed to surround the other one, wherein a thickness and a material of the pair of arc shield plates are the same as those of the first arc shield pattern layers or the second arc shield pattern layers.

11. A high voltage multilayer ceramic capacitor comprising:
a multilayer ceramic sintering body;
a plurality of first inner electrode layers respectively formed inside the multilayer ceramic sintering body to expose an end portion of one side of a first direction toward an end portion of one side of the first direction of the multilayer ceramic sintering body;

a plurality of second inner electrode layers respectively formed inside the multilayer ceramic sintering body to expose an end portion of the other side of the first direction toward an end portion of the other side of the first direction of the multilayer ceramic sintering body and to alternate with the plurality of first inner electrode layers;

a first outer electrode formed to cover the end portion of one side of the first direction of the multilayer ceramic sintering body to be connected to each of the plurality of first inner electrode layers;

a second outer electrode formed to cover the end portion of the other side of the first direction of the multilayer ceramic sintering body to be connected to each of the plurality of second inner electrode layers;

a plurality of first arc shield pattern layers respectively formed inside the multilayer ceramic sintering body to be arranged on a plane the same as those of the plurality of first inner electrode layers and spaced apart from the first inner electrode layers to surround the first inner electrode layers; and a plurality of second arc shield pattern layers respectively formed inside the multilayer ceramic sintering body to be arranged on a plane the same as those of the plurality of second inner electrode layers and spaced apart from the second inner electrode layers to surround the second inner electrode layers, wherein the plurality of first arc shield pattern layers and the plurality of second arc shield pattern layers are respectively configured of:

a first linear arc shield member formed at one side of a second direction perpendicular to the first direction of the first inner electrode layer or the second inner electrode layer inside the multilayer ceramic sintering body to be spaced apart from the first inner electrode layer or the second inner electrode layer;

a second linear arc shield member formed at the other side of the second direction perpendicular to the first direction of the first inner electrode layer or the second inner electrode layer inside the multilayer ceramic sintering body to be spaced apart from the first inner electrode layer or the second inner electrode layer; and a third linear arc shield member formed inside the multilayer ceramic sintering body to be connected to one sides or the other sides of the first direction of the first linear arc shield member and the second linear arc shield member.

12. The capacitor according to claim 11, wherein the first linear arc shield member, the second linear arc shield member and the third linear arc shield member are respectively formed using a metallic material in a thickness the same as a thickness of the first inner electrode layer or the second inner electrode layer and in a width of 30 to 100 µm, and the first linear arc shield member and the second linear arc shield member are respectively formed to expose an end portion of one side or the other side of the first direction toward the end portion of one side or the other side of the first direction of the multilayer ceramic sintering body to be connected to the first outer electrode or the second outer electrode or formed to be spaced apart from the first outer electrode or the second outer electrode, wherein the space gap is 30 to 70 µm.

13. A high voltage multilayer ceramic capacitor comprising:

a multilayer ceramic sintering body;

a plurality of first inner electrode layers respectively formed inside the multilayer ceramic sintering body to expose an end portion of one side of a first direction toward an end portion of one side of the first direction of the multilayer ceramic sintering body;

a plurality of second inner electrode layers respectively formed inside the multilayer ceramic sintering body to expose an end portion of the other side of the first direction toward an end portion of the other side of the first direction of the multilayer ceramic sintering body and to alternate with the plurality of first inner electrode layers;

a first outer electrode formed to cover the end portion of one side of the first direction of the multilayer ceramic sintering body to be connected to each of the plurality of first inner electrode layers;

a second outer electrode formed to cover the end portion of the other side of the first direction of the multilayer ceramic sintering body to be connected to each of the plurality of second inner electrode layers;

a plurality of first arc shield pattern layers respectively formed inside the multilayer ceramic sintering body to be arranged on a plane the same as those of the plurality of first inner electrode layers and spaced apart from the first inner electrode layers to surround the first inner electrode layers; and a plurality of second arc shield pattern layers respectively formed inside the multilayer ceramic sintering body to be arranged on a plane the same as those of the plurality of second inner electrode layers and spaced apart from the second inner electrode layers to surround the second inner electrode layers, wherein the plurality of first arc shield pattern layers and the plurality of second arc shield pattern layers are respectively configured of:

a plurality of first arc shield blocks respectively formed at one side of the second direction perpendicular to the first direction of the first inner electrode layer or the second inner electrode layer inside the multilayer ceramic sintering body to be spaced apart from the first inner electrode layer or the second inner electrode layer and spaced apart from each other by a first gap;

a plurality of second arc shield blocks respectively formed at the other side of the second direction perpendicular to the first direction of the first inner electrode layer or the second inner electrode layer inside the multilayer ceramic sintering body to be spaced apart from the first inner electrode layer or the second inner electrode layer and spaced apart from each other by the first gap; and a plurality of third arc shield blocks formed at one side or the other side of the first direction of each of the first linear arc shield member and the second linear arc shield member inside the multilayer ceramic sintering body to be spaced apart from the first linear arc shield member and the second linear arc shield member by a second gap and to be spaced apart from each other by the first gap, wherein the first gap and the second gap are respectively 30 to 70 µm.

14. The capacitor according to claim 13, wherein the plurality of first arc shield blocks, the plurality of second arc shield blocks and the plurality of third arc shield blocks are respectively formed using a metallic material in a thickness the same as a thickness of the first inner electrode layer or the second inner electrode layer and in a width of 30 to 100 µm, and one of the first arc shield blocks and one of the second arc shield blocks among the plurality of first arc shield blocks and the plurality of second arc shield blocks are respectively formed to expose an end portion of one side or the other side of the first direction toward the end portion of one side or the other side of the first direction of the multilayer ceramic sintering body to be connected to the first outer electrode or the second outer electrode or formed to be spaced apart from the first outer electrode or the second outer electrode by the first gap.

* * * * *